May 14, 1968 D. L. FEASTER 3,383,070

REEL CONSTRUCTION

Filed Sept. 8, 1966

INVENTOR
DONAVON L. FEASTER
BY Wood, Herron & Evans
ATTORNEYS

United States Patent Office 3,383,070

Patented May 14, 1968

3,383,070

REEL CONSTRUCTION

Donavon L. Feaster, Fort Wayne, Ind., assignor to Universal American Corporation, Garrett, Ind., a corporation of Delaware Filed Sept. 8, 1966, Ser. No. 577,850

5 Claims. (Cl. 242—118.6)

ABSTRACT OF THE DISCLOSURE

A wire reel having a cylindrical, metal hub member, a cylindrical barrel member concentrically surrounding the hub member, and a pair of end head members. A pair of retaining members are provided formed of spring wire respectively having annular portions embracing the hub member and welded thereto, and projecting portions extending axially along the surface of the hub toward its opposite ends. The end head members have central openings and are positioned on the ends of the hub member in engagement with the annular portions of the retaining members with the projecting portions of the retaining members respectively extending into apertures in the end head members.

This invention relates generally to reels or spools, and more particularly to reels for storing, shipping and dispensing wire.

One conventional type of wire reel comprises a central hub or arbor tube, a pair of axially spaced-apart end heads or flanges mounted on the hub adjacent its opposite ends, a barrel coaxial with the hub and extending axially between the end heads, and fastening means for holding the reel in assembled relation. In one common form of such a reel construction, the hub is an elongated metal tube and the end heads are formed of wood, plywood or hardboard. In such a reel construction, it is necessary that the end heads be properly located to provide the requisite axial spacing, and also that they be secured rigidly to the hub against rotation thereon. In the past, various arrangements have been employed for providing such location and securement of the end heads to the hub, however those known to the present applicant have been relatively costly to fabricate and/or assemble, particularly where a relatively thick-walled hub or arbor tube is required.

It is accordingly an object of the invention to provide a reel construction incorporating improved means for locating and securing the end head members on the hub member.

Another object of the invention is to provide an improved reel incorporating simplified and readily assembled means for locating and securing the end head members on the hub member.

The invention in its broader aspects provides a reel comprising a cylindrical hub member having opposite ends. A pair of retaining members are provided on the hub member in axially spaced-apart relationship and respectively axially spaced from the opposite ends of the hub member to thereby define end portions of the hub member. Each of the retaining members has an annular portion which embraces the hub member and is secured thereto and a projecting portion which extends axially toward the respective hub end. A pair of end head members are provided respectively having central openings therein for receiving the hub member end portions, each of the end head members having an aperture formed therein adjacent its central opening. The end head members are respectively mounted on the hub member end portions in engagement with the retaining member annular portions and with the retaining member projecting portions respectively extending into the end head member apertures, thereby axially locating the end head members on the hub member and securing them against rotation thereon.

Figure 1:
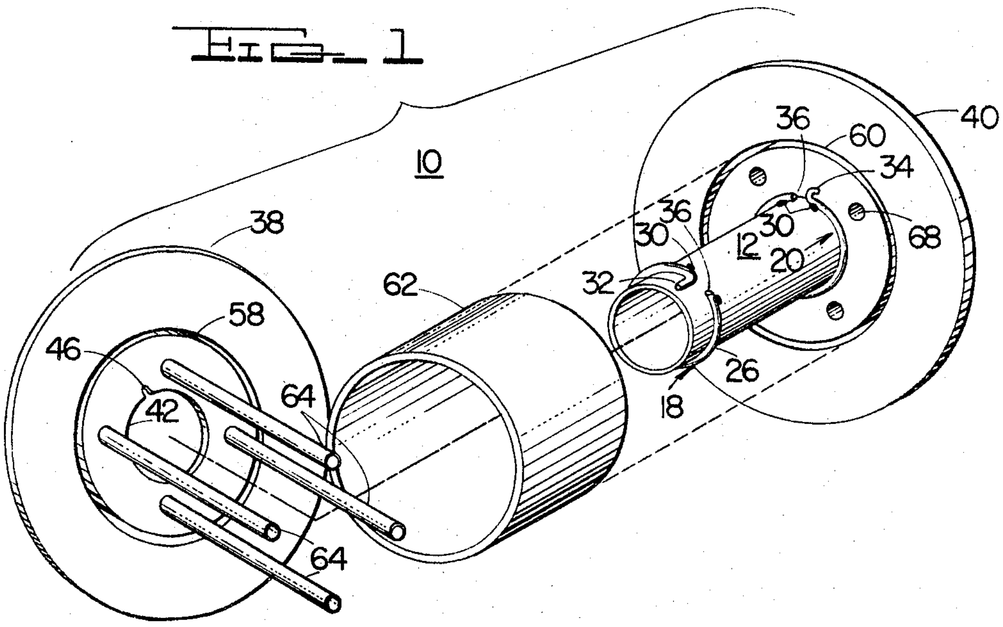
Figure 2:
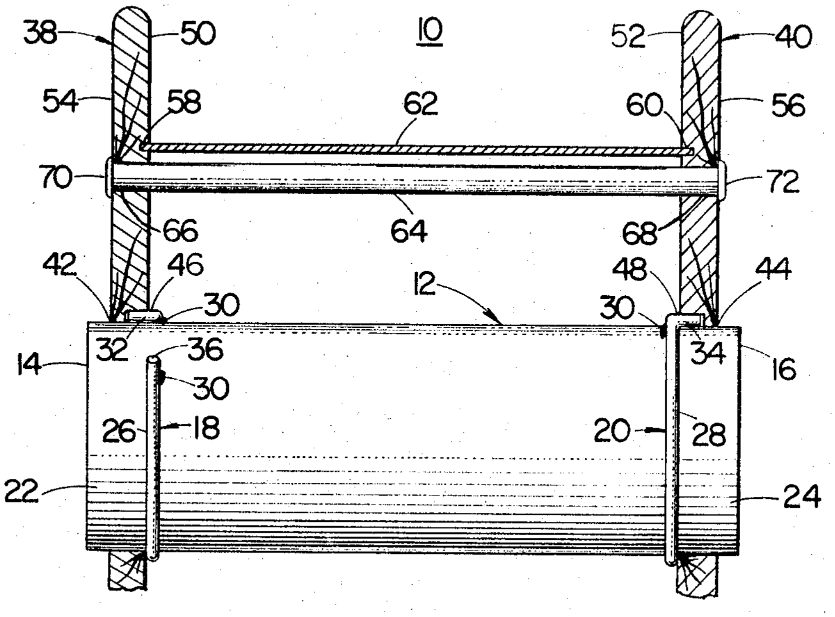

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is an exploded view in perspective showing the improved reel construction of the invention; and FIG. 2 is a fragmentary side view, partly in cross-section, further illustrating the invention.

Referring now to the figures of the drawing, the improved reel of the invention, generally indicated at 10, includes an elongated, cylindrical hub member 12 having opposite ends 14, 16. Hub member 12 is preferably a relatively thick-walled tube formed of suitable metal, such as steel, and may be a seamless tube or a rolled and welded tube, as is well known to those skilled in the art.

A pair of retaining members 18, 20 are provided on the hub member 12 in axially spaced-apart relationship and respectively axially spaced from the ends 14, 16 to define end portions 22, 24. Retaining members 18, 20 respectively have annular portions 26, 28 which embrace the hub member and are secured thereto, as by welding at 30, and projecting portions 32, 34 which extend axially along the surface of the hub member 12 toward the opposite ends 14, 16, as best seen in FIG. 2. Retaining members 18, 20 are preferably formed of spring wire with the annular portions 26, 28 having an initial unstressed inside diameter slightly smaller than the outside diameter of the hub 12. It will be observed that the retaining members 18, 20 are in the form of split rings with the distal ends 36 spaced from the projections 32, 34. Thus, to assemble the retaining members 18, 20 on the hub member 12, it is only necessary to bias the rings apart, the retaining members 18, 20 thus tightly engaging the hub member 12 when properly located upon removal of the biasing or separating force. It will be readily observed that a simple jig or fixture may be provided for properly locating the retaining members 18, 20 on the hub member 12 upon initial assembly thereon and during formation of the welds.

A pair of end head members 38, 40 are provided, preferably formed of rigid material such as wood, plywood or hardboard. End members 38, 40 respectively have central openings 42, 44 formed therein for snugly receiving the end portions 22, 24 of the hub member 12. Apertures 46, 48 are formed in the inner spaces 50, 52 of the end head members 38, 40 communicating with the central openings 42, 44 and extending toward the outer faces 54, 56 but terminating short of the outer faces.

The end heads 38, 40 are positioned on the end portions 22, 24 of the hub member 12 engaging the annular portions 26, 28 of the retaining members 18, 20 and with the projecting portions 32, 34 of the retaining members 18, 20 respectively extending into the apertures 46, 48 and snugly received therein. It will thus be seen that the end heads 38, 40 are axially positioned on the hub member 12 by the annular portions 26, 28 of retaining members 18, 20, thereby providing the requisite axial spacing between the end head members 38, 40 and that the projecting portions 32, 34 seated in the apertures 46, 48 retain the hub member 12 against rotation with respect to the end head members 38, 40.

End head members 38, 40 have annular grooves 58, 60 respectively formed in their inner faces 50, 52 coaxial with and radially outwardly from the central openings 42, 44. A cylindrical barrel member 62 is provided having its opposite ends seated in the annular grooves 58, 60 and extending axially therebetween, barrel member 62 thus coaxially surrounding and being radially spaced from the hub member 12. Barrel member 62 is preferably formed of relatively thin sheet metal or other suitable material.

The reel 10 is held in assembled relation by means of a plurality of elongated rivets or other suitable fasteners 64 respectively extending through radially equally spaced-apart openings 66, 68 formed through the end head members 38, 40 intermediate the barrel member 62 and the hub member 12, rivets 64 extending axially between the end head members 38, 40 and having head portions 70, 72 respectively engaging the outer faces 54, 56 of the end head members 38, 40. Rivets 64 thus clamp the end head members 38, 40 against the annular portions 26, 28 of the retaining members 18, 20 and securely hold the barrel 62 in the annular grooves 58, 60.

It will now be readily seen that the end head members 38, 40 are accurately located on and secured to the hub member 12 by means of the retaining members 18, 20 which can be readily and inexpensively formed with conventional wire bending apparatus and readily assembled on and secured to the hub member 12 with the use of a simple jig or fixture.

While there have been described above the principles of this invention in connection with specific apparatus, it is to be clearly understood that this description is made only by way of example and not as a limitation to the scope of the invention.

What is claimed is:

1. A reel comprising: a cylindrical hub member having opposite ends; a pair of retaining members on said hub member in axially spaced-apart relationship and respectively axially spaced from said opposite ends thereby defining end portions of said hub member, each of said retaining members having an annual portion embracing said hub member and secured thereto and a projecting portion extending axially toward the respective hub end;

and a pair of end head members respectively having central openings therein for receiving said hub member end portions, each of said end head members having an aperture formed therein adjacent said central opening, said end head members being respectively mounted on said hub member end portions in engagement with said retaining member annular portions and with said retaining member projecting portions respectively extending into said apertures whereby said end head members are axially located on said hub member and secured against rotation thereon.

2. The reel of claim 1 wherein said hub member is a metal tube, and wherein said retaining members are formed of wire with said annular portions respectively secured to said hub member by a plurality of welds.

3. The reel of claim 2 wherein said annular portions are respectively split rings having said projecting portions formed at one end and the distal end spaced from said projecting portion.

4. The reel of claim 3 wherein said end head members respectively have annular grooves formed in their facing surfaces coaxial with said hub member;

and further comprising a cylindrical barrel member formed of relatively thin material having opposite ends respectively seated in said grooves and extending axially therebetween, and a plurality of radially spaced-apart elongated fastening members disposed between said hub member and barrel member, said fastening members respectively extending through openings in said end head members and axially therebetween and having head portions engaging the outer surfaces and said end head members thereby clamping said end head members against said retaining members and retaining said barrel member ends in said grooves.

5. The reel of claim 1 wherein said apertures are respectively formed in the facing surfaces of said end head members and respectively communicate with said central openings, said apertures respectively having a depth less than the thickness of said end head members, said apertures respectively snugly receiving said retaining member projecting portions.

References Cited

UNITED STATES PATENTS

| | | | |
|---|---|---|---|
| 1,684,019 | 9/1928 | Farley | 242—118.61 |
| 1,845,820 | 2/1932 | Taylor | 242—118.61 |

GEORGE F. MAUTZ, *Primary Examiner.*